US005637654A

United States Patent [19]
Panandiker et al.

[11] Patent Number: 5,637,654
[45] Date of Patent: Jun. 10, 1997

[54] LOW TEMPERATURE CURE CARBOXYL TERMINATED POLYESTERS

[75] Inventors: Kamlesh P. Panandiker, Shorewood; Timothy Wiedow, Shakopee, both of Minn.

[73] Assignee: McWhorter Technologies, Carpentersville, Ill.

[21] Appl. No.: 700,764

[22] Filed: Aug. 12, 1996

[51] Int. Cl.$^6$ .................................................. C08F 20/00
[52] U.S. Cl. ........................ 525/437; 525/302; 525/304; 525/307; 525/438; 525/934
[58] Field of Search ................................ 525/302, 304, 525/307, 437, 438, 934

[56] References Cited

U.S. PATENT DOCUMENTS

| | | | |
|---|---|---|---|
| 3,355,434 | 11/1967 | Milligan et al. | 528/176 |
| 3,547,885 | 12/1970 | Dante et al. | 528/272 |
| 3,935,168 | 1/1976 | Rashbrook | 528/272 |
| 4,101,601 | 7/1978 | Thomas | 528/272 |
| 4,266,046 | 5/1981 | Wu | 528/309 |
| 4,365,046 | 12/1982 | Pesata, Jr. et al. | 525/438 |
| 4,389,520 | 6/1983 | Gannon | 528/89 |
| 4,528,341 | 7/1985 | Belder et al. | 525/438 |
| 4,565,845 | 1/1986 | Inoue et al. | 525/25 |
| 4,740,580 | 4/1988 | Merck et al. | 528/272 |
| 4,781,808 | 11/1988 | Geist et al. | 204/181.7 |
| 4,804,730 | 2/1989 | Ogata | 528/286 |
| 4,910,287 | 3/1990 | McLafferty et al. | 528/272 |
| 4,933,429 | 6/1990 | McCracken et al. | 528/272 |
| 4,997,900 | 3/1991 | Brinkman | 528/45 |
| 5,006,612 | 4/1991 | Danick et al. | 525/438 |
| 5,034,473 | 7/1991 | Schultz et al. | 525/423 |
| 5,037,903 | 8/1991 | Parker | 525/438 |
| 5,243,011 | 9/1993 | Panandiker et al. | 528/45 |
| 5,321,100 | 6/1994 | Belder et al. | 525/438 |
| 5,326,832 | 7/1994 | Belder et al. | 525/438 |
| 5,414,053 | 5/1995 | Volkmann et al. | 525/438 |
| 5,439,988 | 8/1995 | Moens et al. | 525/437 |

FOREIGN PATENT DOCUMENTS

WO 93/04122  3/1993  WIPO .

OTHER PUBLICATIONS

Cytec Product Brochure entitled "Alkyl Phosphonium Salts", 1994.
Hoppe, "New Developments in Weather Resistant Powder Coatings", J. of Coatings Tech., vol. 60, No. 763, pp. 53–59, Aug. 1988.
Johnson et al., "New Monomers for Polyester Powder Coating Resins", J. of Coatings Tech., vol. 65, No. 826, pp. 19–26, Nov. 1993.
Kirk–Othmer Encyclopedia of Chemical Technology, 4th Ed., vol. No. 6, pp. 635–661 (1993).
Loutz et al., "New develoments in powder coatings", Powder Coatings, vol. 183, No. 4341, pp.584–593 (1993).
Misev et al., "Polyester for powder coatings: Resin parameters correlated with coating properties", J. Oil Colour Chemits' Assoc., 72(9), pp. 363–368 (1989).
Richart, "Power Coating: Current Developments, Future Trends," Paper presented at the Waterborne, High–Solids, and Powder Coating Symposium, Feb. 22–24, 1995.
Smith, "Quaternary Phosponium Compound Latent Accelerators for Anhydride Cured Epoxy Resins,", pp. 42–47.
Thompson, "Advances in powder coatings predicted to earn powder a bigger slice of the finishing pie", Powder Coating, pp. 22–31, Feb. 1993.
Wicks et al., Organic Coatings: Science and Technology, pp. 230–251 (1994).

Primary Examiner—Terressa Mosley
Attorney, Agent, or Firm—Fitch, Even, Tabin & Flannery

[57] ABSTRACT

The present invention is directed to a powdered coating composition which includes a carboxyl terminated polyester, epoxy compounds and an onium catalyst which provide coatings with outstanding properties when cured at low temperatures.

22 Claims, No Drawings

LOW TEMPERATURE CURE CARBOXYL TERMINATED POLYESTERS

The present invention relates to powdered coating compositions which can be cured at low temperatures. More particularly, the present invention relates to carboxyl terminated polyesters, epoxy compounds and an onium catalyst which provide coatings having outstanding properties when cured at low temperature.

BACKGROUND OF THE INVENTION

Thermosetting powder coating compositions are well known in the art and are widely used as paints and varnishes for coating electric appliances, bicycles, garden furniture, accessories for the automotive industry, and the like. Thermosetting powders consist of a mixture of a primary resin and a crosslinker, often called a hardener. The general approach associated with powder coating technology is to formulate a coating from solid components, mix them, disperse pigments (and other insoluble components) in a matrix of the major binder components, and pulverize the formulation into a powder. In so far as possible, each particle contains all of the ingredients in the formulation. The powder is applied to the substrate, usually metal, and fused to a continuous film by baking.

Powder coating technology offers a number of significant ecological advantages over liquid coatings. Film forming components of liquid paints include resins which have required organic solvents to provide the resins with suitable viscosities such that the paint can be applied by existing commercial application equipment. Use of organic solvents, however, raises at least two problems. In the past and potentially in the future, petrochemical shortages mitigate against the use of organic solvent in great volumes. Second, environmental concern mitigates against the use of organic solvents and requires such use be minimized.

Environmental concern has become increasingly important. This concern not only extends to preservation of the environment for its own sake, but extends to public safety as to both living and working conditions. Volatile organic emissions resulting from coating compositions which are applied and used by industry and by the consuming public are not only often unpleasant, but also contribute to photochemical smog. Governments have established regulations setting forth guidelines relating to VOCs which may be released to the atmosphere. The U.S. Environmental Protection Agency (EPA) has established guidelines limiting the amount of VOCs released to the atmosphere, such guidelines being scheduled for adoption or having been adopted by various states of the United States. Guidelines relating to VOCs, such as those of the EPA, and environmental concerns are particularly pertinent to the paint and industrial coating industry which uses organic solvents which are emitted into the atmosphere.

An important factor in the acceptance and growth of the powder coating industry has been their environmental acceptability. These types of coatings are essentially 100% nonvolatile, i.e., no solvents or other pollutants are given off during application or curing.

Powder coatings have distinct economic advantages over liquid, solvent-containing paints. The coating material is well utilized since only the powder in direct contact with the article is retained on the article, any excess powder being, in principle, entirely recoverable and reusable. No solvent storage, solvent dry off oven, or mixing room are required. Air from spray booths is filtered and returned to the room rather than exhausted to the outside. Moreover, less air from the baking oven is exhausted to the outside thus saving energy. Finally, disposal problems are lessened because there is no sludge from the spray booth wash system.

The use of powder coatings further provides advantages in terms of convenience and performance. Powder coating are more convenient to use as compared to other coating methods for many types of applications. They are ready to use, i.e., no thinning or dilution is required. Additionally, they are easily applied by unskilled operators and automatic systems because they do not run, drip, or sag as do liquid coatings.

Powder coatings provide a high level of performance. The reject rate is low, the finish tougher and more abrasion resistant, than most conventional paints. Thicker films provide electrical insulation, corrosion protection, and other functional properties. Powder coatings cover sharp edges for better corrosion protection.

Despite the many advantages associated with powder coatings, these compositions have a number of limitations. A major challenge in developing powder coatings is satisfying a combination of sometimes conflicting needs: (1) stability against sintering during storage, (2) coalescence and leveling at the lowest possible baking temperature, and (3) crosslinking at the lowest possible temperature in the least possible time. Further, the degree of flow and leveling must be balanced to achieve acceptable appearance and protective properties over the range of expected film thicknesses. Films that flow readily before crosslinking may have good appearance, but they may flow away from edges and corners, resulting in poor protection.

If the Tg of the coating is high enough, sintering can be avoided. However, coalescing and leveling at the lowest possible temperature are promoted by having the lowest possible Tg. Short baking times at low temperatures are possible if the resins are highly reactive and if the baking temperature is well above the Tg of the final crosslinked film. However, such compositions may crosslink prematurely during extrusion, and the rapid viscosity increase as the particles fuse in the oven limits the ability of the coating to coalesce and level.

Polyester powder coatings are a well known type of thermosetting coating which are typically formulated with epoxide compounds to yield powders which can be applied to various substrates by electrostatic spraying or fluidized bed and then cured by baking. Triglycidyl isocyanurate (TGIC) has been widely used as a crosslinker for carboxylic acid terminated polyesters. U.S. Pat. Nos. 5,006,612 and 4,740,580 describe powdered coating compositions which are polyester resins with carboxyl functionality for crosslinking with epoxy functional crosslinkers, such as TGIC. However, curing at temperatures below 140° C. is not described and when the composition of the '612 patent is baked for 30 minutes at 138° C., it develops a haze and not very good mechanical properties.

Further, U.S. Pat. No. 5,439,988 describes polyesters for the preparation of thermosetting powder coating compositions useful in varnishes and paints. The carboxyl-terminated polyester of the '988 patent is prepared using a two step process. In the first step a hydroxyl-terminated aliphatic polyester is prepared from 1,4-cyclohexanedicarboxylic acid, as the sole acid, and a cycloaliphatic diol, either alone or in admixture with aliphatic polyols, mixtures of neopentyl glycol and tri- or tetrahydric aliphatic polyols are preferred (column 4, lines 22–24). In the second step, this hydroxyl-terminated polyester is reacted with an aliphatic and/or aromatic dicarboxylic acid or the corresponding anhydride to bring about a chain extension and a carboxylation of the polyester, adipic and isophthalic acid are preferably used (column 4, lines 51–53). The carboxyl-terminated polyester is used together with a triglycidyl isocyanurate to provide thermosetting powder coating compositions. Curing is effected at a temperature from about 150° to 190° C. in about 10 minutes in the presence of up to 1% catalyst (column 3, lines 21–23), including phosphonium salts. However, the problems associated with curing below 150° C. are not addressed.

WO 93/04122 describes carboxyl group bearing polyesters that are formulated with epoxy compounds and phosphonium salts. Curing below about 180° C. and problems associated with curing at lower temperatures are not described.

The problems associated with low temperature cure have been reviewed in a number of articles and patents. While catalyst can be used to reduce the curing temperature in a powder coating system, there are at least two major drawbacks. First, there is a risk of premature reaction during the extrusion process, which is carried out at a minimum temperature of 90°–100° C. Second, poor surface appearance of the applied film may result due to partial crosslinking before complete fusion of the powder. This results in heterogenous film formation which manifest itself as texture and orange peel in the applied film.

Blooming and poor mechanical properties are commonly associated with lower bake temperatures. One of the causes of blooming is the formation of a 22-member cyclic oligomer with a crystalline structure and melting point of 275°–280° C. ("Determination of the Chemical Nature of the "Blooming" Effect in Polyester Based Powder Coatings, 13th International Conference, 15–17 Nov. 1993 Brussels by Hoechst Sara S.P.A.). This 22-member cyclic oligomer normally volatilizes at higher bake temperatures.

Typically, the Tg of the polyester resin must be maintained at a minimum value of about 55° C. in order to avoid caking and sintering of the finished coating powder during storage (Loutz et al., *Polymer Paint Journal* 183(4341):584 (1993).). Such high Tg values are associated with a high viscosity when the polyester is fused at 120°–130° C. Amorphous polyesters generally have a viscosity at 200° C. of from 11–110 poise, which also hinders the formation of a homogenous film.

OBJECTS OF THE INVENTION

It is an object of the invention to provide a powdered coating composition which will maximize film properties such as hardness, flexibility, solvent resistance, corrosion resistance, weatherability and gloss.

It is another object of the invention to provide a powdered coating composition which will be low in VOCs.

It is yet another object of the invention to provide a thermosetting powder coating composition the can be cured at temperatures as low as about 121° C. while providing a coating that eliminates blooming and the poor mechanical properties commonly associated with low temperature curing.

It is another object of the invention to provide a polymeric vehicle with storage stability and desirable melt viscosity.

Other objects, advantages, features and characteristics of the present invention will become more apparent upon consideration of the following description and the appended claims.

SUMMARY OF THE INVENTION

The invention provides a polymeric vehicle for a powder coating composition that can be cured at temperatures as low as about 121° C. The polymeric vehicle of the invention is formulated to provide a coating binder with desirable hardness, flexibility, solvent resistance, corrosion resistance, weatherability and gloss. The enhancement of these properties depends on the optimization and balancing of factors including monomer composition, glass transition temperature (Tg) of the resin, type and amount of crosslinker, curing conditions, curing catalysts, and type and amount of pigments, fillers and additives. The composition of the invention eliminates the blooming that is commonly associated with low temperature curing while providing good flow and wetting of substrate. The reactivity and speed of cure at lower temperature is increased without sacrificing chemical storage stability or causing poor flow of the film due to pre-reaction of triglycidyl isocyanurate (TGIC) with polyester.

The polymeric vehicle of the invention is effective for use as a powder coating composition. The polymeric vehicle comprises from about 85 to about 97 weight percent, based on the weight of the polymeric vehicle, of a carboxylated polyester resin which has an acid value in the range of from about 18 to about 60 and a number average molecular weight in the range of from about 2000 to about 5000. The carboxylated polyester is the reaction product of a hydroxyl terminated polyester and a diacid selected from the group consisting of fumaric acid, maleic acid, adipic acid, isophthalic acid, tertiary butyl isophthalic acid, succinic acid, 1,4-cyclohexane dicarboxylic acid, azelaic acid, dodecane dioic acid, corresponding anhydrides and mixtures thereof. The hydroxyl terminated polyester is the esterification reaction product of an aromatic acid selected from the group consisting of isophthalic acid, terephthalic acid and mixtures thereof, with at least about 25 mole percent of the aromatic acid being isophthalic, and a diol selected from the group consisting of neopentyl glycol, cyclohexane dimethanol, 1,6 hexane diol and mixtures thereof. Optionally, the esterification reaction further includes from about 3 to about 10 mole percent of nonaromatic diacid, from about 2 to about 5 mole percent of a polyacid, and from about 3 to about 10 mole percent of a polyol.

The polymeric vehicle further comprises from about 3 to about 15 weight percent based on the weight of the polymeric vehicle, of a polyepoxide which has an average epoxy functionality of not more than about 4 and an average epoxy equivalent weight in the range of from about 80 to about 300; and an amount of an onium catalyst effective for curing at temperatures as low as about 121° C. The polymeric vehicle of the invention has a Tg of from about 45° C. to about 55° C and a viscosity of less than about 40 poise at 200° C., which polymeric vehicle when crosslinked provides a coating binder having a pencil hardness of at least about HB, an impact resistance of at least about 50 in-lb and a reverse impact resistance of at least about 10 in-lb at a binder thickness of about 1.7–2.1 mils.

In another important aspect, the present invention further provides a process for the preparation of a formulated powdered coating compositions wherein the carboxylated polyester prepared as described herein, is homogeneously mixed with an epoxy compound and an onium catalyst and optionally with auxiliary substances conventionally used in the manufacture of powdered paints and varnishes.

DETAILED DESCRIPTION OF THE INVENTION

Definitions

As used herein "coating binder" is the polymer portion of a coating film after baking and after crosslinking.

"Polymeric vehicle" means all polymeric and resinous components including crosslinking agents in the formulated coating; i.e. before film formation. Pigments and additives may be mixed with the polymeric vehicle to provide a formulated powder coating composition.

"Diol" is a compound with two hydroxyl groups. "Polyol" is a compound with two or more hydroxyl groups.

"Diacid" is a compound with two carboxyl groups. "Polyacid" is a compound with two or more carboxyl groups.

As used in this application, "polymer" means a polymer with repeating monomeric units as defined herein.

A "film" is formed by application of the formulated coating composition to a base or substrate, and crosslinking.

"Sintering" means the loss of particulate characteristics of the powder during storage resulting in lumps or, in extreme cases, a sold mass. Amounts of material are used in the composition of the present invention which are effective for providing a powdered coating that is substantially nonsintered. "Substantially non sintered" means that after exposure of a powder to a given set of conditions, after cooling, to room temperature, it retains its particulate characteristics with only a few lumps which can be readily broken up with moderate pressure.

"Polyester" means a polymer which has linkages in the main chain of the polymer. "Oligomer" means a compound that is a polymer, but has a number average weight not greater than about 10,000 with or without repeating monomeric units.

Acid number or acid value means the number of milligrams of potassium hydroxide required for neutralization of free acids present in 1 g of resin. Hydroxyl number of value which is also called acetyl value is a number which indicates the extent to which a substance may be acetylated; it is the number of milligrams of potassium hydroxide required for neutralization of the acetic acid liberated on saponifying 1 g of acetylated sample.

Carboxylated Polyester

The invention provides a polymeric vehicle for a powder coating composition effective for providing a coating binder with a combination of outstanding properties. The polyesters useful in the practice of the invention are thermosettable carboxyl terminated and suitable for formulation of thermosetting powder coatings with epoxide bearing compounds. This implies that the polyesters have a sufficiently high glass transition temperature to resist sintering when in powder form and subjected to normally encountered field conditions. The polyester of the present invention have a DSC obtained glass transition temperature (Tg) of at least 45° C., wherein the glass transition temperature is obtained by differential scanning calorimetry employing a heat-up rate of 10° C. per minute in a nitrogen atmosphere.

Both the Tg and melt viscosity of the resin are greatly influenced by the choice of monomers. In an important aspect of the invention, the carboxylated polyester resin is made by a two stage process. In stage one, a hydroxyl terminated polyester is prepared, and in stage two the hydroxyl terminated polyester is reacted with a diacid to form a carboxylated polyester.

Stage One: In stage one, a hydroxyl terminated polyester is formed through the esterification or condensation reaction of
(1) an aromatic acid selected from the group consisting of isophthalic acid (IPA), terephthalic acid (TPA) and mixtures thereof, with at least about 25 mole percent of the aromatic acid being isophthalic; and
(2) a diol selected from the group consisting of neopentyl glycol, cyclohexane dimethanol, 1,6 hexane diol and mixtures thereof.

Aromatic Acid: In an important aspect of the invention, good mechanical properties are provided and blooming is eliminated by controlling the composition of the hydroxyl terminated polyester. By replacing terephthalic acid with a minimum amount of isophthalic acid, blooming is eliminated. While not intending to be bound by any theory, the presence of a minimum level of isophthalic acid in the composition appears to disrupt the formation of a 22-member cyclic oligomer and hence eliminate one of the causes of blooming. In an important aspect of the invention, the TPA/IPA molar ratio is in the range of about 60/40 to about 75/25. In an alternative aspect of the invention, the IPA may be replaced with tertiary butyl isophthalic acid.

In another important aspect of the invention, by eliminating terephthalic acid and using all isophthalic acid, no cyclic oligomer is formed and hence no blooming occurs. In order to obtain improved mechanical properties, cyclohexane dimethanol is used in place of neopentyl glycol.

Diols: In another important aspect of the invention, the Tg of the polymeric vehicle is optimized by controlling the ratio of diols present in the composition. The combination of neopentyl glycol and 1,6 hexane diol in a molar ratio of about 84:16 provides a polymeric vehicle with an acceptable Tg. In an important aspect of the invention, the diols of the composition include neopentyl glycol, cyclohexane dimethanol and 1,6 hexane diol in a molar ratio of about 80:10:10 to about 85:0.5:15. The diol component is present in amount effective for providing the polymeric vehicle and subsequent coating with the properties described.

In another alternative aspect of the invention, neopentyl glycol can be replaced with a diol selected from the group consisting of 2-butyl-2-ethyl-1,3 propanediol (BEPD), 1,4 butane diol, 3-hydroxy-2,2-dimethyl propyl-3-hydroxy-2,2-dimethyl propionate, unoxol 6 diol, methyl propane diol, 2-methyl-1,3-propane diol (MPD), hydroxylpivalyl hydroxypivalate (HPHP), hydrogenated Bisphenol A and mixtures thereof, and addition of polyols, such as trimethylolpropane (TMP), trimethylolethane (TME), pentaerythoritol (PE), ditrimethylolproane (DI-TMP).

Optionally, the esterification or condensation reaction may further include
(3) from about 3 to about 10 mole percent of a nonaromatic diacid selected from the group consisting of 1,4-cyclohexane dicarboxylic acid (CHDA), HHPA and mixtures thereof;
(4) from about 2 to about 5 mole percent of a polyacid selected from the group consisting of trimellitic anhydride (TMA), citric and mixtures thereof; and
(5) a polyol selected from the group consisting of trimethylol propane, trimethylolethane, pentaerythoritol, ditrimethylolproane and mixtures thereof.

Nonaromatic Acids: Performance characteristics of the powder coating may be improved by the incorporation of additional monomers. The use of nonaromatic acids improves flexibility and resistance to yellowing (as a result of exposure to ultraviolet radiation) compared to aromatic diacids.

The hydroxyl terminated polyester prepared in stage one has a hydroxyl value in the range of from about 60 to about 100, and preferably between about 60 and about 80.

Stage Two: In stage two, the hydroxyl terminated polyester prepared in stage one is reacted with a diacid to from the carboxylated polyester. As used herein, diacid means aliphatic or aromatic diacid, saturated or unsaturated acid or anhydride thereof. Suitable diacids include fumaric, maleic, adipic, isophthalic, tertiary butyl isophthalic, succinic, 1,4-cyclohexane dicarboxylic, azelaic, dodecane dioic, glutaric acid and mixtures thereof.

As the number average molecular weight of the carboxylated polyester and hydroxyl value of the hydroxyl terminated polyester vary, the equivalents of diacid to react with the hydroxyl terminated polyester also will vary.

The resulting carboxyl terminated polyester has an acid value in the range of from about 18 to about 60, and a number average molecular weight in the range of from about 2000 to about 5000.

Polyepoxide ps The polyepoxy compounds that can be used for the preparation of thermosetting powder compositions according to the invention are the conventional polyepoxide compounds used in these types of compositions. The polyepoxide has an average epoxy functionality of not more than about 4 and an epoxy equivalent weight of from about 80 to about 300. Examples of such epoxy resins include triglycidyl isocyanurate (TGIC), glycidyl trimellitate, diglycidyl terephthlate, diglycidyl isophthalate and PT-910 (available from CIBA GEIGY).

In an important aspect of the invention, the polyepoxy compound is TGIC and is used in an amount of from about 3% to about 9% weight percent, base on the weight of the polymeric vehicle, preferably from about 0.8 to about 1.2 equivalent of epoxy groups per equivalent of carboxyl groups in the carboxyl terminated polyester. As the acid value of the carboxyl terminated polyester increases, more polyepoxide will be required to provide a suitable cured coating film.

In an alternative aspect of the invention, crosslinking is effected with compounds other than epoxy compounds. For example, compounds such as B-hydroxyalkylamide (Primid XL-552) is effective for use with the polyester compounds of present invention, and provides coatings with good film performance.

Catalyst

The type and concentration of catalyst are important factors in obtaining cure temperatures as low as about 121° C. To reduce the curing temperature of carboxyl terminated polyester with TGIC, a catalyst is utilized. In an important aspect of the invention, the catalyst is an onium compound preferably selected from group consisting of tetra butyl phosphonium bromide, triphenyl ethyl phosphonium bromide, triphenyl ethyl phosphonium iodide, formyl methylene triphenyl phosphorane, formyl methyl triphenyl phosphonium chloride, benzolymethylene triphenyl phosphorane, phenyl triethyl phosphonium bromide, methoxy carbonyl methyl phosphonium bromide, ethyl triphenyl phosphoranylidene acetate, methyl triphenyl phosphoranylidene acetate, ethoxy carbonyl methyl triphenyl phosphonium bromide, ethyl triphenyl phosponium acetate-acetic acid complex and mixtures thereof.

The amount of an onium catalyst to be employed depends upon the reactants used and the particular onium catalyst. In any event, an onium catalyst is added in an amount effective to allow for curing at temperatures as low as 121° C. Concentration of catalyst is an important factor in reducing curing temperature and curing time. In an important aspect of the invention, the concentration of onium catalyst is about 0.05 weight percent to about 0.5 weight percent, based on the weight of the polymeric vehicle. In a preferred aspect of the invention, low temperature curing is achieved with a concentration of onium catalyst of about 0.3 weight percent to about 0.5 weight percent, based on the weight of the polymeric vehicle. Preferably, the catalyst is added to the liquid melt of the carboxyl polyester component prior to flaking.

Preparation of the Thermosetting Powder

For the preparation of the thermosetting powder compositions, the carboxyl terminated polyester, the polyepoxide compound and various auxiliary substances conventionally used for the manufacture of powder paints and varnishes are mixed homogeneously. This homogenization is carried out for example by melting the polyester, the polyepoxide compound and the various auxiliary substances at a temperature within the range of from about 80° to 110° C., preferably in an extruder, for example a Buss-Ko-Kneader extruder or a twin-screw extruder of the Werner-Pfleiderer or Baker Perkins type. The extrudate is then allowed to cool, is ground and sieved to obtain a powder, the particle size of which is between 10 and 120 micrometers.

Another factor affecting viscosity and flow is the level of pigmentation and fillers in the system. High levels of pigmentation and/or fillers detract from the flow of the system by increasing the melt viscosity. Fine particle size organic pigments such as carbon black, phthalocyanine blue and quinacridones cause a significant increase in melt viscosity even at low levels.

The auxiliary substances which can be added to the thermosetting compositions according to the invention include ultraviolet light absorbing compounds such as Tinuvin 900 (from CIBA-GEIGY Corp.), light stabilizers based on sterically hindered amines (for example Tinuvin 144 from CIBA-GEIGY Corp.), phenolic antioxidants (for example Irganox 1010 or Irgafos P-EPQ from CIBA-GEIGY Corp.) and stabilizers of the phosphonite or phosphite type. A variety of pigments may also be added to the thermosetting compositions according to the invention. Examples of pigments that may be employed in the invention metal oxides such as titanium dioxide, iron oxide, zinc oxide and the like, metal hydroxides, metal powders, sulfides, sulfates, carbonates, silicates such as aluminum silicate, carbon black, talc, china clays, barytes, iron blues, lead blues, organic reds, organic maroons and the like. As auxiliary substances may also include flow control agents such as Resiflow PV5 (from WORLEE), Modaflow (from MONSANTO), Acronal 4F (from BASF), Resiflow P-67 (from Estron), plasticizers such as dicyclohexyl phthalate, triphenyl phosphate, grinding aids, degassing agents such as benzoin and fillers. These auxiliary substances are added in conventional amounts, it being understood that if the thermosetting compositions of the inventions are used as clear coatings, opacifying auxiliary substances should be omitted.

The powder paints and clear coatings which are the subject matter of the present invention are suitable to be applied on articles to be coated by conventional techniques, i.e. by application by means of an electrostatic or triboelectric spray gun or by the well-known fluidized bed coating technique.

After having been applied on the article in question, the deposited coatings are cured by heating in an oven at a temperature of about 121° C. for about 30 minutes in order to obtain sufficient crosslinking to provide the described coating properties. Alternatively, desirable coating properties can be obtained by curing at a temperature of about 138° C. for about 15 minutes, heating at about 204° C. for about 3 minutes in coil coating applications, and by heating at about 235° C. for about 60 seconds. Curing by infrared (IR) is also applicable.

Low Temperature Cure

In an important aspect of the invention, the polymeric vehicle can be cured at temperatures as low as about 121° C.

The decrease of curing temperature is economically and technically advantageous since it brings about an economy of energy on the one hand and a more certain and constant quality of the final coatings on the other hand. Another advantage is the possibility of coating substrates which are more sensitive to heat thus broadening the field of application of this type of product.

Coating Properties

Another advantageous characteristic of the invention is that the coatings prepared from the compositions containing the polyesters according to the invention have a combination of outstanding properties. Improving the appearance of coatings applied as powders to be equivalent to the highest quality finishes is an important consideration and the present invention provides coatings with excellent appearance. While conventional coatings can be applied as a relatively low viscosity liquid to give a smooth film after removal of water and/or solvents, applied powder particles must melt, flow, wet the substrate, coalesce to form a continuous film and level. The polymeric vehicle of the present invention is effective for providing a stable melt viscosity and flow.

While solvent/water based coatings can utilize polymer systems with a glass transition temperature, Tg, even below room temperature, the Tg of a coating powder must be above 45° C. in order to possess acceptable non sintering characteristics. If the Tg of the coating is high enough, sintering can be avoided. However, coalescing and leveling at the lowest possible temperature are promoted by having the lowest possible Tg. The present invention optimizes Tg in combination with other factors to avoid sintering while providing coalescing and leveling at low temperature.

The following examples illustrate methods for carrying out the invention and should be understood to be illustrative of, but not limiting upon, the scope of the invention which is defined in the appended claims.

EXAMPLES

Example 1

Preparation of Carboxyl Terminated Polyesters

Stage 1

Preparation of Hydroxyl Terminated Oligomer

| Reactant | Moles | Weight |
|---|---|---|
| Neopentyl glycol | 13.60 | 707 gms. |
| Cyclohexane dimethanol | 0.08 | 6 gms. |
| 1,6 Hexane diol | 2.40 | 142 gms. |
| Terephthalic acid | 8.43 | 700 gms. |
| Isophthalic acid | 5.61 | 466 gms. |
| Butylchlorotin dihydroxide | (0.1%/wt %) | 2.2 gms. |

This mixture was heated to 240° C. to an acid value of 7.5 with ICI plate and cone viscosity at 175° C. of 4.8 poise. The hydroxyl number of this oligomer was found to be 70.

Stage 2

Preparation of Carboxylic Acid Terminated Polyester

The above oligomer was cooled to 180° C. and added 179 gms of fumaric acid. The temperature was raised to 210° -215° C. and vacuum was applied slowly over a 30-minute period until a vacuum of 23–24 inches was obtained. The reaction was monitored by taking a sample and running the acid number and ICI cone and plate viscosity at 200° C. After an acid value of 30–35 and ICI viscosity at 200° C. of 13–20 poise were obtained, the melt was cooled down to 195° C. and 8.0 gms of triphenyl ethyl phosphonium bromide catalyst was added and mixed into the resin for 20 minutes. After this period, the resin was discharged from the flask. The color of the resin was a light yellow in color. The final resin had an acid number of 30.8, ICI cone and plate viscosity at 200° C. of 18.6 poise, a glass transition temperature of 49.2° C. by DSC and Gardner Holdt color as a 50 wt. % solution in N-methyl-2-pyrrolidone of less than 1.

Example 2

Properties of Carboxyl Terminated Polyesters

Following the procedure described in Example I, compositions were prepared as indicated in Table 1.

TABLE I

| Composition and Properties of the Exemplified Polyesters | | | | | | | | | | | |
|---|---|---|---|---|---|---|---|---|---|---|---|
| Composition (g) | 1 | 2A | 2B | 2C | 2D | 2E | 2F | 2G | 2H | 2I | 2J |
| Neopentyl Glycol | 707 | | 719 | 819 | 805 | | | | | | 707 |
| Cyclohexane Dimethanol | 6 | 894 | 6 | 5 | 6 | 913 | 293 | 903 | 878 | 875 | 6 |
| 1,6-Hexanediol | 142 | | | | | | | | | | 142 |
| 2-Butyl-2-Ethyl-1,3-Propanediol | | 105 | | | | 108 | 109 | 106 | 103 | 103 | |
| 1,4-Butanediol | | | 110 | | | | | | | | |
| Trimethylol Propane | | | | | 14 | | | | | | |
| Terephthalic Acid | 700 | | 711 | 715 | 692 | | | | | | 700 |
| Isophthalic Acid | 466 | 993 | 473 | 476 | 461 | 1006 | 1018 | 995 | 968 | 1085 | 466 |
| Butylchlorotin dihydroxide | 2.2 | 2.2 | 2.2 | 2.2 | 2.2 | 2.2 | 2.2 | 2.2 | 2.2 | 2.2 | 2.2 |
| Fumaric Acid | 179 | | 182 | | | 173 | | | | | 179 |
| Adipic Acid | | 208 | | 185 | 223 | | | | | | |
| Succinic Anhydride | | | | | | | 150 | | | | |
| Glutaric Acid | | | | | | | | 195 | | | |
| 1,4-Cyclohexane Dicarboxylic Acid | | | | | | | | | 250 | | |
| Azelaic Acid | | | | | | | | | | 137 | |
| Phosphonium Halide Catalyst | 8 | 8 | 8 | 8 | 8 | 8 | 8 | 8 | 8 | 8 | |

The compositions had the following properties.

| Properties | Properties | | | | | | | | | | |
|---|---|---|---|---|---|---|---|---|---|---|---|
| | 1 | 2A | 2B | 2C | 2D | 2E | 2F | 2G | 2H | 2I | 2J |
| Acid Number (mg KOH/g) | 30.8 | 35.6 | 35.9 | 34.2 | 35.7 | 32.4 | 30.4 | 33.2 | 33.9 | 32.4 | 35.1 |
| Viscosity at 200° C. (poise) | 18.6 | 26.4 | 21.4 | 12.4 | 13.8 | 81.0 | 30.0 | 29.0 | 52.0 | 54.0 | 13.6 |
| Tg (DSC) | 49.2° C. | 45.5° C. | 55.4° C. | 44.5° C. | 41.2° C. | 59.3° C. | 51.8° C. | 57.4° C. | 63.8° C. | 47.7° C. | 49.2° C. |

[a]Flow properties evaluated according to PCI Test Standard Panels. Rating Scale: 10 = Smooth; 1 = Poor Flow.
[b]Paint Storage Stability evaluated according to PCI test method 1 for Accelerated Stability Test.

Example 3

Preparation of Powder Coatings

All polyesters were evaluated by the following method. 88.39g of the granulated polyester resin was dry mixed with 6.65g triglycidyl isocyanurate, 1.43g Modaflow Powder III, 0.68g Benzoin and 2.85g carbon black (from Columbia Chemicals, Raven 22) and subsequently introduced into an extruder (Werner Pfleiderer, ZSK 30). The extrudate was cooled, ground and sieved. The sieved fraction smaller than 105 microns was collected and used as the powder coating. This powder coating was electrostatically sprayed onto steel panels. The physical properties of the formulated powder coating are determined after a 15-minute cure at 138° C. for a 1.7 to 2.4 mils film thickness. The compositions and the test results of these powder coatings are given in Table 2.

TABLE 2

| Formulation (weight %) | (BAKE SCHEDULE: 15 minutes at 138° C. (280° F.) |
|---|---|
| Polyester Resin | 88.39 |
| Triglycidyl Isocyanurate | 6.65 |
| Modaflow Powder III | 1.43 |
| Benzoin | 0.68 |
| Carbon Black | 2.85 |

| Coating Properties | 1 | 2A | 2B | 2C | 2D | 2E | 2F | 2G | 2H | 2I | 2J |
|---|---|---|---|---|---|---|---|---|---|---|---|
| Gloss 60° (ASTM D522) | 94 | 93 | 93 | 92 | 92 | 41 | 92 | 92 | 91 | 93 | 89 |
| Gloss 20° (ASTM D522) | 73 | 73 | 65 | 75 | 62 | 8 | 73 | 76 | 252 | 64 | 60 |
| Impact Direct (ASTM D2794) | 160 | 160 | 160 | 160 | 160 | 160 | 160 | 80 | 50 | 100 | 120 |
| Reverse (ASTM D2794) | 160 | 160 | 160 | 160 | 160 | 160 | 80 | <20 | 10 | 40 | 120 |
| Adhesion (ASTM D3002) | Exc. | Exc. | Exc. | Exc. | Exc. | Exc. | Exc. | Exc. | Exc. | Exc. | Exc. |
| Pencil Hardness | 2H | 2H | 3H | 2H | F | 2H | 2H | 2H | 2H | H | 2H |
| MEK Rubs (50 Dbl)* | 5 | 2–3 | 5 | 4 | 4 | 5 | 5 | 3 | 3 | 3 | 3 |
| ⅛" Mandrel Bend | Pass | Pass | Pass | Pass | Pass | Pass | Pass | Pass | Pass | Pass | Pass |
| Flow[a] | 4 | 2 | 2 | 7 | 2 | 4 | 4 | 4 | 1 | 2 | 5 |
| Paint Storage Stability @ 40° C[b] | P | P | P | P | F | P | P | P | P | P | P |

[a]Flow properties evaluated according to PCI Test Standard Panels. Rating Scale: 10 = Smooth; 1 = Poor Flow.
[b]Paint Storage Stability evaluated according to PCI test method 1 for Accelerated Stability Test.
*Judged visually on a scale of 0–5 in which 0 = penetration to the substrate in 50 dbl rubs or less; 5 = no effect on surface after 50 dbl rubs.
**2J Bake Schedule: 10 minutes at 204° C.; it did not give good impacts when baked at 15 minutes at 138° C.

TABLE 3

BAKE SCHEDULE: 30 minutes at 121° C.
Coating Properties:

| Coating Properties | 1 | 2A | 2B | 2C |
|---|---|---|---|---|
| Gloss 60° | 94 | 96 | 93 | 92 |
| Gloss 20° | 79 | 73 | 61 | 74 |
| Impact Direct | 160 | 160 | 160 | 30 |
| Reverse | 160 | 160 | 160 | <10 |
| Adhesion | Exc. | Exc. | Exc. | Exc. |
| Pencil Hardness | 2H | 2H | 2H | 2H |
| MEK Rubs (50 Dbl)* | 4 | 2–3 | 4 | 2 |
| ⅛" Mandrel Bend (ASTM D522) | Pass | Pass | Pass | Pass |

*Judged visually on a scale of 0–5 in which 0 = penetration to the substrate in 50 dbl rubs or less; 5 = no effect on surface after 50 dbl rubs.

Example 4 and 4b

Comparison of Coating Compositions

A commercial non-catalyzed powder coating (described in U.S. Pat. No. 5,006,612), a competitors powder coating (available from DSM N.V. Netherlands), and a powder coating prepared as described in Example 1 were formulated as shown in Table 4 and electrostatically sprayed onto steel panels. Properties of the coatings are given in Table 4.

TABLE 4

POWDER COATING FORMULATIONS

| | WEIGHT PERCENTAGES | | |
|---|---|---|---|
| Commercial Non-Catalyzed Resin | 88.39 | — | — |
| Competitor's Resin | — | 88.39 | — |
| Example 1 Resin | — | — | 88.39 |
| TGIC | 6.65 | 6.65 | 6.65 |
| Modaflow Powder III | 1.43 | 1.43 | 1.43 |
| Benzoin | 0.68 | 0.68 | 0.68 |
| Carbon Black | 2.85 | 2.85 | 2.85 |
| Total | 100.00 | 100.00 | 100.00 |
| Polyester/TGIC Ratio | 93/7 | 93/7 | 93/7 |

This commercial non-catalyzed powdered coating fails to cure at any of the temperatures as seen by the poor MEK resistance and impact resistance. The competitive product failed at all three temperatures, while the composition of Example 1 passes at all temperatures.

EXAMPLE 5

Powder Coatings with Non-Epoxy Crosslinker

A powder coating composition was prepared as indicated in Example 1 having the following composition.

| Coating Formulation | (wt. %) |
|---|---|
| Example 1 Polyester | 68.73 |
| Primid XL-552 | 3.62 |
| Benzoin | 0.52 |
| Resiflow P-67 | 1.09 |
| R-960 Tio2 | 26.04 |
| | 100.00 |

Coating properties were evaluated as set forth in Example 3 as follows.

| Coating Properties | |
|---|---|
| Gloss 60° (ASTM D522) | 92 |
| Gloss 20° (ASTM D522) | 76 |
| Impact Direct, in-lbs. | 160 |
| Impact Reverse, in-lbs. | 160 |
| Pencil Hardness | H |
| Solvent Rubs (50 Dbl)* | 5 |
| ⅛" Conical Mandrel Bend | Pass |
| Crosshatch Adhesion | 100% |
| Flow[a] | 5 |
| Paint Storage Stability @ 40° C.[b] | P |

*Judged visually on a scale of 0–5 in which 0 = penetration to the substrate in 50 double rubs or less; 5 = no effect on surface after 50 double rubs.
[a]Flow properties evaluated according to PCI test standard panels. Rating scale: 10 = smooth; 1 = poor flow.
[b]Paint storage stability evaluated according to PCI test method 1 for Accelerated Stability Test.

a. Flow properties evaluated according to PCI test standard panels. Rating scale: 10 =smooth; 1 =poor flow.

b. Paint storage stability evaluated according to PCI test method 1 for Accelerated Stability Test.

TABLE 4a

| | COMMERCIAL NON-CATALYZED | | | COMPETITIVE PRODUCT | | | EXAMPLE 1 | | |
|---|---|---|---|---|---|---|---|---|---|
| BAKE SCHEDULE | 3 min 204° C. | 15 min @ 138° C. | 30 min @ 121° C. | 3 min. @ 204° C. | 15 min @ 138° C. | 30 min @ 121° C. | 3 min @ 204° C. | 15 min @ 138° C. | 30 min @ 121° C. |
| Gloss 60°/20° | 96/89 | 95/85 | 94/77 | 92/71 | 91/62 | 92/64 | 95/72 | 93/64 | 95/67 |
| Impact D/R in-lbs. | 10/<10 | <10/<10 | <10/<10 | 30/<10 | 10/<10 | 10/<10 | 160/160 | 160/160 | 160/160 |
| Pencil Hardness | H | HB | B | F | F | F | H | 2H | 2H |
| MEK Rubs (50 down)* | 0 | 0 | 0 | 0 | 0 | 0 | 4 | 4 | 4 |
| Cross Hatch Adhesion | 100% | 90% | 70% | 100% | 100% | 95% | 100% | 100% | 100% |
| Conical Mandrels, ⅛" | FAIL | FAIL | FAIL | FAIL | FAIL | FAIL | PASS | PASS | PASS |
| Blooming | NO | YES | YES | NO | NO | NO | NO | NO | NO |

*Judged visually on a scale of 0–5 in which: 0 = Penetration to substrate in 50 double rubs or less; 5 = No effect on surface after 50 double rubs.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A powder polymeric vehicle comprising:

from about 85 to about 95 weight percent, based on the weight of the polymeric vehicle, of a carboxylated polyester resin which has an acid value in the range of from about 18 to about 60 and a number average molecular weight in the range of from about 2000 to about 5000, wherein the carboxylated polyester is the reaction product of a hydroxyl terminated polyester, and a diacid selected from the group consisting of fumaric acid, maleic acid, adipic acid, isophthalic acid, tertiary butyl isophthalic acid, succinic acid, 1,4-cyclohexane dicarboxylic acid, azelaic acid, dodecane dioic acid, corresponding anhydrides, and mixtures thereof, wherein the hydroxyl terminated polyester is a reaction product of an aromatic acid selected from the group consisting of isophthalic acid, terephthalic acid and mixtures thereof, with at least about 25 mole percent of the aromatic acid being isophthalic, and a diol selected from the group consisting of neopentyl glycol, cyclohexane dimethanol, 1,6 hexane diol and mixtures thereof;

from about 3 to about 15 weight percent, based on the weight of the polymeric vehicle, of a polyepoxide which has an average epoxy functionality of not more than about 4 and an average epoxy equivalent weight in the range of from about 80 to about 300; and an onium catalyst in an amount effective for curing the polymeric vehicle at temperatures not more than about 121° C., the polymeric vehicle having a Tg of from about 45° C. to about 60° C. and a viscosity of less than about 40 poise at 200° C., which polymeric vehicle when cured provides a coating binder having a pencil hardness of at least about HB, a direct impact resistance of at least about 50 in-lbs and a reverse impact resistance of at least about 10 in-lbs at a binder thickness of about 1.7–2.1 mils.

2. A powder polymeric vehicle as recited in claim 1, wherein terephthalic acid and isophthalic acid are present in a molar ratio of from about 60:40 to about 75:25.

3. A powder polymeric vehicle as recited in claim 1, wherein the diol is a combination of neopentyl glycol and 1,6 hexane diol which are present in a molar ratio of about 84:16.

4. A powder polymeric vehicle as recited in claim 1, wherein the diol is a combination of neopentyl glycol, cyclohexane dimethanol and 1,6 hexane diol which are present in a molar ratio of from about 84:10:10 to about 85:0.5:15.

5. A powder polymeric vehicle as recited in claim 1, wherein the polyepoxide is selected from the group consisting of triglycidyl isocyanurate, glycidyl trimellitate, diglycidyl terephthlate, diglycidyl isophthalate, PT-910 and mixtures thereof.

6. A powder polymeric vehicle as recited in claim 5, wherein the polyepoxide is triglycidyl isocyanurate, and the triglycidyl isocyanurate is present in an amount of from about 3 to about 9 weight percent, based on the weight of the polymeric vehicle.

7. A powder polymeric vehicle as recited in claim 1, wherein the onium catalyst is selected from the group consisting of tetra butyl phosphonium bromide, triphenyl ethyl phosphonium bromide, triphenyl ethyl phosphonium iodide, formyl methylene triphenyl phosphorane, formyl methyl triphenyl phosphonium chloride, benzolymethylene triphenyl phosphorane, phenyl triethyl phosphonium bromide, methoxy carbonyl methyl phosphonium bromide, ethyl triphenyl phosphoranylidene acetate, methyl triphenyl phosphoranylidene acetate, ethoxy carbonyl methyl triphenyl phosphonium bromide, ethyl triphenyl phosponium acetate-acetic acid complex and mixtures thereof.

8. A powder polymeric vehicle as recited in claim 7, wherein the onium catalyst is present at a concentration of 0.05 to about 0.5 weight percent, based on the weight of the polymeric vehicle.

9. A powder polymeric vehicle as recited in claim 1, wherein the hydroxyl terminated polyester is the reaction product of an aromatic acid selected from the group consisting of isophthalic acid, terephthalic acid and mixtures thereof, with at least about 25 mole percent of the aromatic acid being isophthalic, from about 3 to about 10 mole percent of a non-aromatic acid selected from the group consisting of 1,4-cyclohexane dicarboxylic acid, HHPA and mixtures thereof, from about 2 to about 5 mole percent of a polyacid selected from the group consisting of trimellitic anhydride, citric acid and mixtures thereof, a diol selected from the group consisting of neopentyl glycol, cyclohexane dimethanol, 1,6 hexane diol and mixtures thereof, and from about 3 to about 10 mole percent of a polyol selected from the group consisting of trimethylolpropane, trimethylol ethane, pentaerythoritol, ditrimethylolpropane and mixtures thereof.

10. A powder polymeric vehicle comprising:

from about 85 to about 95 weight percent, based on the weight of the polymeric vehicle, of a carboxylated polyester resin which has an acid value in the range of from about 18 to about 60 and a number average molecular weight in the range of from about 2000 to about 5000, wherein the carboxylated polyester is the reaction product of a hydroxyl terminated polyester and a diacid selected from the group consisting of fumaric acid, maleic acid, adipic acid, isophthalic acid, tertiary butyl isophthalic acid, succinic acid, 1,4-cyclohexane dicarboxylic acid, azelaic acid, dodecane dioic acid, corresponding anhydrides, and mixtures thereof, wherein the hydroxyl terminated polyester is the reaction product of an aromatic acid selected from the group consisting of isophthalic acid, terephthalic acid and mixtures thereof, with at least about 25 mole percent of the aromatic acid being isophthalic, from about 3 to about 10 mole percent of a nonaromatic diacid selected from the group consisting of 1,4-cyclohexane dicarboxylic acid, HHPA and mixtures thereof, from about 2 to about 5 mole percent of a polyacid selected from the group consisting of trimellitic anhydride, citric acid and mixtures thereof, a diol selected from the group consisting of neopentyl glycol, cyclohexane dimethanol, 1,6 hexane diol and mixtures thereof, and from about 3 to about 10 mole percent of a polyol selected from the group consisting of trimethylolpropane, trimethylol ethane, pentaerythoritol, ditrimethylolpropane and mixtures thereof;

from about 3 to about 15 weight percent based on the weight of the polymeric vehicle, of a polyepoxide which has an average epoxy functionality of not more than about 4 and an average epoxy equivalent weight in the range of from about 80 to about 300; and an onium catalyst in an amount effective for curing the polymeric vehicle at temperatures not more than about 121° C., the polymeric vehicle having a Tg of from about 45° C. to about 60° C. and a viscosity of less than about 40 poise at 200° C., which polymeric vehicle when cured provides a coating binder having a pencil hardness of at least about HB, a direct impact resistance of at least about 50 inch-lbs. and a reverse impact resistance of at least about 10 inch-lbs. at a binder thickness of about 1.7–2.1 mils.

11. A powder polymeric vehicle as recited in claim 10, wherein terephthalic acid and isophthalic acid are present in a molar ratio of from about 60:40 to about 75:25.

12. A powder polymeric vehicle as recited in claim 10, wherein the diol is a combination of neopentyl glycol and 1,6 hexane diol which are present in a molar ratio of about 84:16.

13. A powder polymeric vehicle as recited in claim 10, wherein the diol is a combination of neopentyl glycol, cyclohexane dimethanol and 1,6 hexane diol which are present in a molar ratio of from about 84:10:10 to about 85:0.5:15.

14. A powder polymeric vehicle as recited in claim 10, wherein the polyepoxide is selected from the group consisting of triglycidyl isocyanurate, glycidyl trimellitate, diglycidyl terephthlate, diglycidyl isophthalate, PT-910 and mixtures thereof.

15. A powder polymeric vehicle as recited in claim 14, wherein the polyepoxide is triglycidyl isocyanurate, and the triglycidyl isocyanurate is present in an amount of from about 3 to about 9 weight percent, based on the weight of the polymeric vehicle.

16. A process for preparing a formulated powdered coating composition which when applied to a substrate is effective for providing a coating binder having a Tg of about 45° C. to about 60° C., a pencil hardness of at least about HB, a direct impact resistance of at least about 50 in-lbs and a reverse impact resistance of at least about 10 in-lbs at a binder thickness of about 1.7–2.1 mils, the process comprising:

mixing a carboxylated polyester resin with a polyepoxide compound and an onium catalyst to provide a polymeric vehicle, wherein the carboxylated polyester is the reaction product of a hydroxyl terminated polyester and a diacid selected from the group consisting of fumaric acid, maleic acid, adipic acid, isophthalic acid, tertiary butyl isophthalic acid, succinic acid, 1,4-cyclohexane dicarboxylic acid, azelaic acid, dodecane dioic acid, corresponding anhydrides and mixtures thereof, and the hydroxyl terminated polyester is the reaction product of an aromatic acid selected from the group consisting of isophthalic acid, terephthalic acid and mixtures thereof, with at least about 25 mole percent of the aromatic acid being isophthalic, and a diol selected from the group consisting of neopentyl glycol, cyclohexane dimethanol, 1,6 hexane diol and mixtures thereof, wherein the polyepoxide has an average epoxy functionality of not more than about 4 and an average epoxy equivalent weight in the range of from about 80 to about 300, wherein the onium catalyst is present in an amount effective for curing at temperatures not more than about 121° C.

17. A process as recited in claim 16, wherein terephthalic acid and isophthalic acid are present in a molar ratio of from about 60:40 to about 75:25.

18. A process as recited in claim 16, wherein the diol is a combination of neopentyl glycol and 1,6 hexane diol which are present in a molar ratio of about 84:16.

19. A process as recited in claim 16, wherein the diol is a combination of neopentyl glycol, cyclohexane dimethanol and 1,6 hexane diol which are present in a molar ratio of from about 84:10:10 to about 85:0.5:15.

20. A process as recited in claim 16, wherein the polyepoxide is selected from the group consisting of triglycidyl isocyanurate, glycidyl trimellitate, diglycidyl terephthlate, diglycidyl isophthalate, PT-910 and mixtures thereof.

21. A process as recited in claim 20, wherein the polyepoxide is triglycidyl isocyanurate, and the triglycidyl isocyanurate is present in an amount of from about 3 to about 9 weight percent, based on the weight of the polymeric vehicle.

22. A process as recited in claim 16, wherein the onium catalyst is selected from the group consisting of tetra butyl phosphonium bromide, triphenyl ethyl phosphonium bromide, triphenyl ethyl phosphonium iodide, formyl methylene triphenyl phosphorane, formyl methyl triphenyl phosphonium chloride, benzolymethylene triphenyl phosphorane, phenyl triethyl phosphonium bromide, methoxy carbonyl methyl phosphonium bromide, ethyl triphenyl phosphoranylidene acetate, methyl triphenyl phosphoranylidene acetate, ethoxy carbonyl methyl triphenyl phosphonium bromide, ethyl triphenyl phosponium acetate-acetic acid complex and mixtures thereof.

* * * * *